Patented Sept. 1, 1942

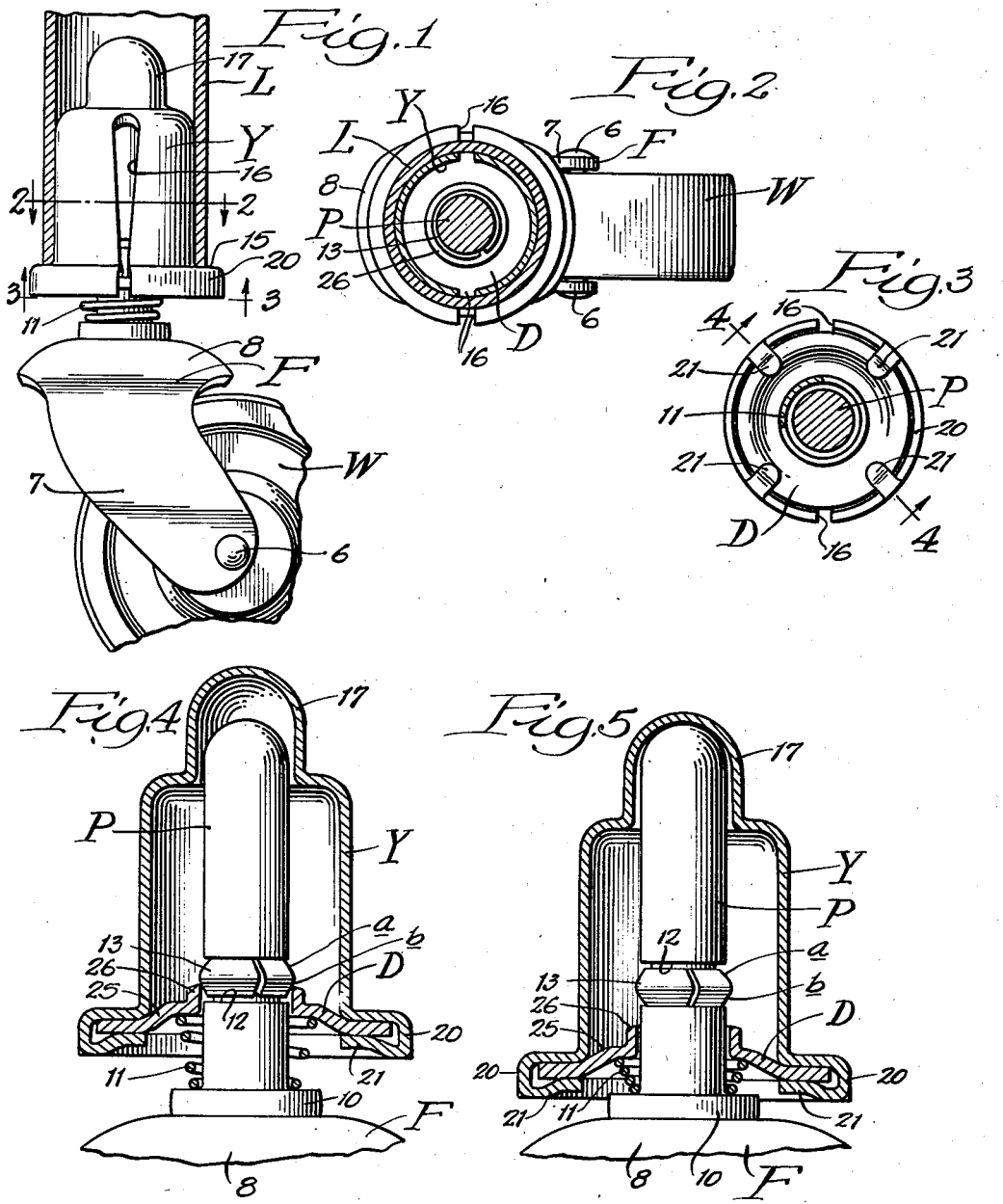

2,294,807

UNITED STATES PATENT OFFICE 2,294,807

CASTER

Edward Schultz, Jr., Chicago, Ill., assignor to The Nagel-Chase Mfg. Co., Chicago, Ill., a corporation of Illinois Application July 5, 1941, Serial No. 401,087

4 Claims. (Cl. 16—44)

My present invention relates to a caster which is designed especially for use with light machinery, such as washing machines, ironing machines, etc. It embodies in its construction a frame in which is rotatably mounted a caster wheel and from which is upwardly extended a pintle which is receivable within a yoke that is adapted for fitting within the open lower end of a tubular leg. The features of improvement which characterize this invention relate particularly to the yoke which comprises in its assembly a disk having a seat formed around a central opening through which the pintle is extended, and to certain spring means associated with the pintle by which the yoke is releasably secured thereto and is resiliently supported with respect to the frame so as to be self-compensating in the event of an excess of load being imposed upon any one caster in the set, or of unevenness in the floor upon which the machine is placed.

A suggestive embodiment of my invention is set forth in the accompanying drawing wherein—

Figure 1 is a view in elevation of the present caster within the lower end of a tubular leg which is shown in section;

Figs. 2 and 3 are transverse sections taken, respectively, on lines 2—2 and 3—3 of Fig. 1; and Figs. 4 and 5 are transverse sections taken, respectively, on line 4—4 of Fig. 3, the two figures displaying opposite extreme operating positions of the yoke in relation to the pintle.

As here shown, a caster wheel W is equipped with an axle 6 opposite ends of which are supported in the two parallel arms 7 of a frame F having at its upper end a head 8 whereon to support a pintle P which upstands therefrom. The pintle top end is rounded for a purpose that will presently appear. At the base of the pintle is a flange 10 resting upon the frame head and affording an abutment for one end of a spring 11 which is coiled around the pintle. At a point which is spaced from the base flange the pintle is formed with a circumferential groove 12 within which is fitted a split spring ring 13 having a bowed outer contour to provide in effect opposed reversed cam faces a and b. The spring may decrease in diameter toward its lower end so as to frictionally engage with the pintle adjacent its base flange, thereby normally maintaining the spring in assembled relation with the pintle.

Associated with the caster having the pintle end spring just described is a yoke Y which, as shown, is of generally tubular form with an outwardly extended flange 15 at its base. This yoke is provided with opposite slots 16 each extending from the base to a point relatively close to its upper end where the diameter of the yoke is reduced to form in effect a dome extension 17 which is closed and rounded at the top. The two sections of the yoke which are separated by the slots may be slightly resilient so as to be compressible for facilitating insertion of the yoke into the open lower end of a tubular leg L. When so fitted in place, as shown in Fig. 1, the yoke will tend to remain securely therein.

The flange at the yoke base extends outwardly to form a shoulder against which the lower end of the leg may rest. This flange is also bent downwardly to provide a skirt 20 from which certain lugs 21 may be inwardly extended as best shown in Figs. 3, 4 and 5. A disk D is receivable against the under side of the flange and within the skirt thereof where it is adapted to be locked in place by an inward and upward bending of the lugs, as shown. The outer portion of the disk is flat so as to bear squarely against the under side of the yoke flange, but inwardly thereof it is offset upwardly as at 25 to provide a circular seat, and is then formed with an upwardly extending collar 26 whose inner diameter is such as to freely surround the pintle. The collar diameter, however, is somewhat less than is that of the bowed spring ring at this point of maximum diameter, consequently the assembly of the pintle within the yoke can be accomplished only by forcing the spring ring through the collar opening, involving in consequence a temporary compression of the spring.

In the position shown in Fig. 4 the caster-pintle is assembled with the yoke-washer to the point of forcing the collar past the spring ring. The yoke will accordingly tend to remain assembled in this position where its collar seat is engaged by the spring to receive a light thrust from its upper end. Normally the yoke will remain in this endwise position. Under conditions of a heavy load, however, the spring may yield to permit the yoke to descend upon the pintle to the point that the upper end of the pintle becomes engaged with the dome head of the yoke. In this position the spring is substantially fully compressed, and it will be noted (see Fig. 5) that the base of the yoke has moved relatively close to the head of the caster frame. The parts will occupy this relationship usually only when an excess of load is being sustained. Ordinarily the spring will have sufficient strength to maintain the yoke in an upper position such as is shown in Fig. 4, or in a floating position where it may move either up or down. In all of its adjusted positions the yoke is maintained in coaxial relationship with the pintle due to the support which is afforded by the spaced bearings, i. e., the dome walls near the top and the collar near the bottom. When the yoke is in its downmost position, its rounded closed top is engaged by the rounded top end of the pintle, the former providing a thrust bearing for the latter which is at all times free to rotate thereagainst.

The present caster has numerous advantages from a manufacturing standpoint. The yoke may be readily formed from dies and its uniformity as to size and shape is such that it may be depended upon to fit operatively within the open end of a tubular leg of the diameter for which the yoke is designed. The assembly of the disk within the yoke is also a simple operation, and once secured in place, there need be no concern about this relationship remaining permanent. The disk diameter, also the location of its offset, is such that it may be depended upon to remain in concentric relation with the yoke. The seat formed on the under side of the disk adjacent the sloping walls to the outside thereof is such as to assure that the larger upper end of the spring will remain centered in relation therewith. This is important as otherwise the spring might tend to tilt to one side thereby failing in the exertion of a force necessary for the work that it is counted upon to do.

A feature of particular advantage is the split spring ring which, when fitted in the pintle groove, will remain permanently in place. This ring has an outer bowed contour such that it cooperates with the collar of the washer to provide therewith a releasable connection which tends to maintain the caster-pintle unit in assembled relation with the yoke. Should it ever be desired, however, to separate the one from the other, this may be accomplished by the application of an endwise force sufficient to compel the spring to compress in response to the pressure that will then be exerted upon it by the surrounding collar. In the same way, the pintle-caster unit may initially be assembled with the caster by a reversal of the movement just described.

I claim:

1. In a caster, a base, a pintle upstanding from the base, a load supporting yoke of tubular form open at the bottom and closed at the top and movable vertically with respect to the pintle and arranged to rest upon the upper end of the pintle to support the load thereon only when the yoke is at the limit of its downward movement, a spring supported by said base for urging the yoke upwardly, and means for connecting the spring with the yoke whereby the spring will normally floatably support the yoke out of contact with the upper end of the pintle in slidable relation with said pintle when the yoke is subjected to a load within the supporting capacity of the spring.

2. In a caster, a base, a pintle upstanding from the base, a load supporting yoke of tubular form open at the bottom and closed at the top and movable vertically with respect to the pintle and arranged to rest upon the upper end of the pintle to support the load thereon only when the yoke is at the limit of its downward movement, a spring supported by said base for urging the yoke upwardly, means for connecting the spring with the yoke whereby the spring will normally floatably support the yoke out of contact with the upper end of the pintle in slidable relation with said pintle when the yoke is subjected to a load within the supporting capacity of the spring, and a resilient stop for yieldably and releasably confining the spring and the yoke in operative connection with the pintle and arranged to permit free sliding and rotary movement of the yoke within definite limits.

3. In a caster, a base, a pintle upstanding from the base, a load supporting yoke of tubular form open at the bottom and closed at the top and movable vertically with respect to the pintle and arranged to rest upon the upper end of the pintle to support the load only when the yoke is at the limit of its downward movement, a spring supported upon said base, a disk slidable on the pintle and connected at its periphery to the yoke, a spring supported upon the base and extending upwardly therefrom and supporting at its upper end said disk for yieldably urging the yoke upwardly and maintaining the yoke in floatable, slidable relation with the pintle when the yoke is subjected to a load within the supporting capacity of the spring, and a resilient stop mounted on the pintle at a point intermediate of its ends and of less diameter than the yoke and spaced therefrom throughout the entire movement of the yoke and arranged to permit free, sliding and rotary movement of the yoke within definite limits and arranged to be engaged by the disk under the actuation of the spring to maintain the disk and the yoke in assembled relation with the pintle when the yoke is not subjected to a load.

4. In a caster, a base, a load supporting yoke of tubular form open at the bottom and closed at the top and having a reduced portion forming a journal bearing for the pintle and movable upwardly and downwardly on the pintle with respect to the same, a spring supported by said base and engaging means on the yoke for supporting the yoke with its closed end above and spaced from and out of contact with the upper end of the pintle and in floating relation to the pintle when the yoke is subjected to a load within the supporting capacity of the spring.

EDWARD SCHULTZ, Jr.